United States Patent [19]

Nishino

[11] Patent Number: 4,957,723

[45] Date of Patent: Sep. 18, 1990

[54] CONDUCTIVE COATING COMPOSITION COMPRISING GRAPHITE INTERCALATION COMPOUND AND PROCESS FOR PREPARING THE INTERCALATION COMPOUND

[75] Inventor: Hiroshi Nishino, Yokohama, Japan

[73] Assignees: Arata Yamassaki; SK Kohki Co., Ltd., both of Tokyo, Japan

[21] Appl. No.: 253,519

[22] Filed: Oct. 5, 1988

[30] Foreign Application Priority Data

Oct. 6, 1987 [JP] Japan ................................. 62-250642
Dec. 29, 1987 [JP] Japan ................................. 62-333282
Feb. 16, 1988 [JP] Japan ................................. 63-31759

[51] Int. Cl.$^5$ ...................... C01B 31/02; H01B 1/06; C09C 1/56
[52] U.S. Cl. ................................ 423/449; 423/448; 423/460; 252/502; 252/506; 252/508; 252/511
[58] Field of Search ............... 252/511, 502, 506, 508, 252/511, 518, 519; 423/460, 458, 448, 449, 408

[56] References Cited

U.S. PATENT DOCUMENTS 4,749,514 6/1988 Murakami et al. ................... 423/449

OTHER PUBLICATIONS

Stumpp, E.; "The Intercalation of Metal Chlorides and Bromides into Graphite", *Materials Science and Engineering*, No. 31 (1977), pp. 53–59.

Metz, W. et al.; "Charakterisierung Von Graphit-FeCl$_3$-Verbindungen Alsteilweise Geordnet Schichtstrukturen", *Carbon*, vol. 13 (1975), pp. 87–86.

Flandrois, S. et al., "Intercalation Compounds of Graphite with Nickel Chloride: Synthesis, Structure, and Mechanism of Intercalation", *Synthetic Metals*, No. 3, (1981), pp. 1–13.

Eickhoff, H. P. et al., "The Formation of CdCl$_2$--Graphite From Melts with KCl: The Equilibrium of Nucleation", *Carbon*, vol. 5, pp. 641–644.

*Primary Examiner*—Josephine Barr
*Attorney, Agent, or Firm*—Armstrong, Nikaido, Marmelstein, Kubovcik & Murray

[57] ABSTRACT

A conductive coating composition comprising a graphite intercalation compound, carbon black, a binder, and a solvent is provided. The graphite intercalation compound is prepared by a process comprising reacting a dried metal chloride, a salt capable of forming a molten salt together with the metal chloride, and a graphite in a molten state in a chlorine gas stream under atmospheric pressure or a process comprising reacting a dried metal chloride, a salt capable of forming a molten salt together with said metal chloride, a salt capable of forming a double salt in a gas phase together with the metal chloride, and a graphite in a molten state in a chlorine gas stream under atmospheric pressure.

2 Claims, No Drawings

CONDUCTIVE COATING COMPOSITION COMPRISING GRAPHITE INTERCALATION COMPOUND AND PROCESS FOR PREPARING THE INTERCALATION COMPOUND

BACKGROUND OF THE INVENTION

The present invention relates to a conductive coating composition comprising a graphite intercalation compound and a process for preparing the graphite intercalation compound.

A conductive coating composition known in the art comprises a fine powder having in itself electrical conductivity, e.g., metals such as silver, copper and nickel, or graphite and carbon black, dispersed in various binders and solvents.

When the metallic fine powder is used, an electrical conductivity of about $10^{-5}$ $\Omega$.cm in terms of volume specific resistance is obtained. However, silver is not only remarkably high in the price per unit weight of the composition but also undergoes a great change in the price. The powder of the other metals brings about a chemical change, such as oxidation, and further no sufficient measure has been taken against the occurrence of a migration phenomenon wherein the fine metallic powder migrates between adjacent coating films.

Although a coating composition containing carbon black dispersed therein brings about no problem accompanying the use of the fine metallic powder, the electrical conductivity is not very high and $10^{-2}$ $\Omega$.cm at the highest.

It is known that a conductive coating composition prepared by graft polymerizing various monomers in a solvent and dispersing carbon black therein is mixed with a silver dispersion coating composition for the purpose of preventing the migration of silver in a coating composition containing silver dispersed therein. However, this expedient is disadvantageous in that the conductive coating composition is poor in the compatibility with the silver dispersion coating composition.

On the other hand, as is known, a graphite intercalation compound (hereinafter abbreviated to "GIC") comprises graphite and various metals or compounds intercalated between crystalline layers of the graphite.

Known metals which are intercalated into graphite include alkali metals such as Li, Na, and K and known compounds which are intercalated into graphite include metal halides such as $SbF_5$, $CuCl_2$, $NiCl_2$, and $FeCl_2$ and acid compounds such as $HNO_3$ and $H_2SO_4$. The above-described GIC has attracted attention as a substitute for metals because it has excellent electrical conductivity, and various processes for preparing GIC are known. For example, GIC wherein a metal chloride is intercalated is prepared by the following process (a) or (b).

(a) A process in which a mixture of an anhydrous metal chloride with graphite or a mixture of a molten salt of a metal chloride with graphite is heated in vacuo, in an inert gas or in a chlorine gas atmosphere. In this process, a reaction is usually conducted by putting a mixture of the starting materials in a glass tube or putting graphite and metal chloride at different positions in a glass tube, melt-sealing or sealing the glass tube, and heating the glass tube at 400° to 500° C. to react the starting materials.

(b) A process in which a mixture of graphite with a metal chloride is heated in a chlorine gas stream.

Since process (a) uses a melt-sealed or sealed glass tube or vessel, it is unsuitable for production of GIC on a commercial scale. Specifically, there is no vessel material suitable for heating a metal chloride at 400° C. or above except for glass. Furthermore, although depending upon the kind of metal chlorides used, a considerable internal pressure builds up at such a high temperature due to the vapor pressure of a metal chloride itself and a chlorine gas generated by thermal dissociation of the chloride, so that it is very difficult to use a glass vessel having a large opening in a sealed state.

Further, in process (a), the reaction rate is low and the reaction time is as long as at least a day, which also makes it difficult to prepare GIC on a commercial scale.

In the case of process (b) as well, the reaction rate is low, and it takes several to ten days or longer to prepare GIC containing an intended amount of a metal, a compound, or the like intercalated between crystalline layers thereof.

SUMMARY OF THE INVENTION

A first object of the present invention is to provide a coating composition having high electrical conductivity comparable to that of a conventional conductive coating composition containing a fine metallic powder dispersed therein.

A second object of the present invention is to provide a conductive coating composition which is highly miscible with other conductive coating compositions, particularly a coating composition containing a fine metallic powder dispersed therein which can prevent the migration of the powder.

A third object of the present invention is to provide an industrial process for preparing GIC as a component of a conductive coating composition.

A fourth object of the present invention is to provide an industrial process for preparing highly heat-resistant GIC comprising a high melting point metal chloride intercalated between crystalline layers of graphite.

DETAILED DESCRIPTION OF THE PREFERRED EMBODIMENTS

The conductive coating composition of the present invention comprises GIC, carbon black, and a binder. The GIC may be one prepared by any process Specifically, GIC prepared by the above-described conventional process and GIC prepared by the process according to the present invention which will be described later can be employed alike. GIC containing, intercalated thereinto, a metallic chloride such as $CdCl_2$, $CuCl_2$, $CoCl_2$, $NiCl_2$ or $CrCl_3$ or nitric acid is preferable from the viewpoint of the cost of the starting material, and GIC containing $CuCl_2$ or $CoCl_2$ intercalated thereinto is most preferable.

GICs of stages 1 to 5 may be used, among which those of stages 3 and 4 are preferable from the viewpoint of electrical conductivity of the coating composition.

The term "stage" is used to distinguish the state of graphite containing a metal, a compound, or the like intercalated between crystalline layers thereof For example, the term "stage 1" is intended to mean a state wherein a compound or the like is intercalated into all interstices between the adjacent crystalline layers, the term "stage 2" is intended to mean a state wherein a crystalline layer interstice free from any compound or the like intercalated thereinto exists between two pairs of crystalline layers each having an interstice into which a compound or the like is intercalated, and the term "stage 3" is intended to mean a state wherein two crystalline layer interstices each free from a compound or the like intercalated thereinto exist between two pairs of crystalline layers each having an interstice into which a compound or the like is intercalated. The larger the number of stages, the larger the number of crystalline layers free from a compound or the like intercalated therebetween. GIC having an average particle diameter of 40 to 60 μm is generally used.

The carbon black (hereinafter abbreviated to "CB") used in the present invention may be a commercially available one. However, it is preferable to use Ketjen Black EC (a product of Akzo Chemie, the Netherlands) or Printex EX 2 (a product of Degussa Inc., U.S.A.). Since these CBs are superior to other CBs in the structure and physical properties such as pore volume and specific surface area, they can impart excellent electrical conductivity in combination with GIC.

The mixing weight ratio of GIC to CB is generally 8/2 to 6/4, most preferably 7/3. When the ratio is outside this range, no effect derived from mixing of GIC with CB can be attained.

The binder used in the present invention may be properly selected according to the kind of the base material to which the composition of the present invention is applied. Since, however, a polyethylene terephthalate film is often used as the base material, a polyester resin having a structure similar to that of the polyethylene terephthalate film is preferable from the viewpoint of adhesion, flexibility, and miscibility with a paste ink such as a commercially available silver powder. Examples of such a polyester resin include Stafix (a product of Fuji Photo Film Co., Ltd.) and Vylon (a product of Toyobo Co., Ltd.) wherein the structures of the acid group and polyhydric alcohol group are varied in order to improve the solubility in the solvent. In particular, the former exhibits excellent adhesion to various metals and synthetic resin films.

With respect to the amount of the binder, when it is expressed in terms of the amount of carbon based on 100 parts by weight of the binder resin (PHR), the total amount of GIC in terms of graphite and CB is 60 to 130 parts by weight, preferably 90 to 110 parts by weight from the viewpoint of electrical conductivity.

When the total amount of GIC in terms of graphite and CB is less than 60 parts by weight or exceeds 130 parts by weight, not only the electrical conductivity but also physical properties such as the printing characteristics and adhesion are lowered.

When the binder is a polyester resin, a small amount of the OH groups peculiar to a polyester remains. In this case, a suitable curing agent, e.g., a curing agent wherein an isocyanate group is masked with an acetoacetate, such as Coronate 2971 manufactured by Nippon Polyurethane Industry Co., Ltd., may be incorporated for the purpose of improving the hardness, environmental resistance, etc. of the coating film after drying.

Since the solvent as a final blending component affects the printing characteristics, drying and curing rate, etc., it is necessary to select an optimum solvent. Further, it is preferred from the viewpoint of drying characteristics that the solvent have a boiling point of 170° to 220° C.

Examples of the solvent which can well dissolve a modified polyethylene glycol terephthalate (Stafix) as the binder include diethylene glycol acetate $C_2H_5(OCH_2CH_2)_2OCOCH_3$ (DEGA) having a boiling point of 217.4° C. The amount of the solvent, i.e., a volatile component, in the coating composition is 55 to 70% by weight, preferably 60 to 65% by weight.

When the amount of the solvent exceeds 70% by weight, the viscosity is lowered. However, the use of the solvent in such a large amount is unfavorable not only from the viewpoint of preparing a coating film having a necessary thickness but also because the physical properties of the coating film are poor.

On the other hand, when the amount of the solvent is less than 60% by weight, the viscosity is increased, which brings about a lowering in the printing characteristics.

The conductive coating composition of the present invention can be prepared by placing the above-described binder and solvent, each in a predetermined amount, in a vessel equipped with an agitator and a heating device, agitating and heating the mixture to prepare a binder solution, adding GIC and CB each in a predetermined amount to the binder solution, and sufficiently mixing and kneading them. The conductive coating composition of the present invention thus prepared has excellent electrical conductivity resulting from a combined use of a graphite intercalation compound and carbon black. For example, the coating composition of the present invention has a volume specific resistance of $10^{-3}$ Ω.cm, while the volume specific resistance of the conventional coating composition is $10^{-2}$ Ω.cm.

Further, the coating composition of the present invention exhibits various features such as excellent adhesion to a polyester film substrate resulting from the use of a polyester resin as the binder and a solvent having a boiling point of 170° to 220° C.; uniform dispersion of the graphite intercalation compound; and short drying and curing time.

Further, the coating composition of the present invention is excellent in its printing characteristics and flexibility as well as in its environmental resistance, such as heat and oxidation resistance.

The process for preparing GIC according to the present invention will now be described.

Process (A) for preparing GIC comprises reacting a dried metal chloride, a salt capable of forming a molten salt together with the metal chloride and graphite in a chlorine gas stream in a molten state under atmospheric pressure.

Examples of the metal chloride to be intercalated into graphite include $CdCl_2$, $CuCl_2$, $CoCl_2$, $NiCl_2$, and $CrCl_3$. Among them, $CdCl_2$, $CuCl_2$, $CoCl_2$, $NiCl_2$, and $CrCl_3$ are preferable.

The above-described metal chlorides are used in combination with a salt for forming a molten salt of these metal chlorides.

KCl, NaCl, $CaCl_2$, etc. are used as a salt for forming a molten salt, among which KCl and NaCl are preferable from the viewpoint of cost, easiness of recovery, and handleability.

KCl and NaCl may be used alone or in the form of a mixture of them.

In general, the combination of the metal chloride with the salt for forming a molten salt and proportions of the metal chloride and the salt can be selected from a molten salt phase diagram described in, e.g., Phase Diagrams for Ceramists; Phase Diagrams, A Literature Source Book, Parts A and B, and various related technical journals etc. The combination of the metal chloride with the salt for forming a molten salt and composition at the eutectic point picked up from the above literature for use in the present invention are shown in the following Table 1.

TABLE 1

| metal halide | melting point (°C.) | eutectic point and composition in phase diagram | | |
|---|---|---|---|---|
| | | combination of molten salts | eutectic point (°C.) | composition at eutectic point (mol %)[1] |
| AlCl$_3$ | 190 | NaCl—AlCl$_3$ | 110 | 66 |
| FeCl$_3$ | 303 | KCl—FeCl$_3$ | 202 | 53 |
| CdCl$_2$ | 568 | NaCl—CdCl$_2$ | 397 | 58 |
| CuCl$_2$ | 598 | NaCl—CuCl$_2$ | 380 | 45 |
| CoCl$_2$ | 735 | NaCl—CoCl$_2$ | 370 | 56[2] |
| NiCl$_2$ | 993 | KCl—NiCl$_2$ | 507 | 28 |
| CrCl$_3$ | 1150 | NaCl—CrCl$_3$ | 450 | 62.5 |

Note:
[1] composition of metal chloride to be intercalated into graphite
[2] % by weight The combination of the metal chloride with the salt for forming a molten salt used in the present invention is not limited to a particular one, and any combination may be used.

In the present invention, the metal halide intercalated into graphite is used in an amount larger than the ratio at the eutectic point of the metal chloride to the salt for forming a molten salt together with the chloride.

This is to surely intercalate the metal chloride into graphite. Although the amount of the excessive metal chloride is varied depending upon the combination of the metal chloride with the salt for forming a molten salt, the metal halide intercalated into graphite is generally used in an amount 5 to 10 times larger than the composition of the metal chloride at the eutectic point.

The proportion of the metal chloride relative to graphite is also varied depending upon the kind of the metal chloride, and the metal chloride is used in an amount of 0.5 to 1.2 mol per mol of graphite. For example, in the case of CuCl$_2$-KCl, the metal chloride is used in an amount of at least 0.82 mol (0.67 mol in the case of KCl) per mol of graphite. Although the upper limit is varied depending upon the temperature, CuCl$_2$ may be used in such an amount as will not bring about the coexistence of solid phase CuCl$_2$ in the molten reaction system. When the amount of CuCl$_2$ is less than 0.82 mol, it becomes difficult to prepare a low stage GIC.

The graphite used in the present invention may be any of natural graphite and powdery, fibrous and sheet-like artificial graphite, and single crystal artificial graphite known as HOPG. The graphite is preferably purified natural graphite having a fixed carbon content of more than 99%.

It is preferred from the viewpoint of preparation of an intercalation compound that the graphite have a large particle size. When graphite having a larger average particle diameter is used, a lower stage GIC is prepared. However, when the average particle diameter is too large, it becomes difficult to conduct screen process printing. For this reason, the graphite used has an average particle diameter of generally 20 to 70 μm, preferably 40 to 50 μm and a particle size distribution of 5 to 140 μm, preferably 20 to 100 μm.

In the present invention, it is preferred that the above-described individual starting materials are sufficiently dried prior to the reaction.

In particular, when the metal chloride has water of crystallization, insufficient dehydration makes it very difficult to intercalate the metal chloride into the graphite. Therefore, it is particularly preferred that, in addition to the drying of the graphite, the hydrous metal chloride be sufficiently dried.

The reaction is conducted by homogeneously mixing a metal chloride, a salt for forming a molten salt of the metal chloride, and graphite, placing the mixture in a glass vessel, and passing a chlorine gas through the reaction system under atmospheric pressure while heating and melting the mixture. By this process, there is prepared an intended graphite intercalation compound.

It is not always necessary to pass the chlorine gas through the reaction mixture, and satisfactory results can be attained simply by flowing the chlorine gas above the reaction mixture.

The chlorine gas may be used in such an amount as will supplement the chlorine gas formed by the decomposition of the metal chloride. The reaction is conducted under atmospheric pressure. There is no need of using an autoclave or melt-sealing or sealing the vessel.

The reaction temperature is 380° to 450° C. When the reaction temperature is lower than 380° C., there is a possibility that a solid phase component might coexist in the liquid phase. On the other hand, when the reaction temperature exceeds 450° C., it is difficult to prepare a low stage GIC.

It is not particularly necessary to conduct agitation during the reaction. However, when a reaction vessel having a large capacity is used, it is preferred that agitation be conducted in order to uniformly progress the reaction.

According to process (A) for preparing GIC, a molten salt can be prepared from a metal chloride and a salt for forming a molten salt of the metal chloride. Therefore, in this process, not only can the reaction temperature be lower than that in the case where a metal salt is reacted alone with graphite by 50° to 80° C., but also it is possible to conduct a homogeneous reaction in the liquid phase.

Further, since the reaction is conducted under atmospheric pressure, the use of a glass vessel suffices for attaining the purpose, so that it possible to use a glass vessel having a large capacity. There is no need of using an autoclave.

Further, since the reaction is conducted in a chlorine gas stream, it is possible for the reaction rate to be remarkably improved through the function of the chlorine gas similar to that of a catalyst with respect to the reaction for intercalating the metal salt into the graphite layer.

Therefore, the present invention is suitable for the preparation of a graphite intercalation compound on a commercial scale.

Process (B) for preparing GIC will now be described.

As can be seen in the following Table 2, GIC containing a metal chloride intercalated thereinto has an improved thermal stability (ceiling temperature of GIC in continuous use) with an increase in the melting point of the intercalated metal chloride of GIC.

For example, the stability of GIC of CuCl$_2$ (ceiling temperature of GIC in continuous use: 150° C.) is superior to that of GIC of AlCl$_3$ or FECl$_3$ (ceiling temperature of GIC in continuous use: <150° C.).

GICs of CdCl$_2$, CoCl$_2$, NiCl$_2$ and CrCl$_3$ have higher ceiling temperatures in continuous use than that of GIC of CuCl$_2$, i.e., are superior to GIC of CuCl$_2$ in the heat resistance.

This fact shows that excellent electromagnetic and infrared shielding materials can be provided by using GIC of a metal chloride having a high melting point as a conductive coating, a plastic filler or the like.

Accordingly, process (B) for preparing GIC provides a process for efficiently preparing GIC exhibiting excellent stability particularly at high temperatures and excellent electrical conductivity.

TABLE 2

| metal chloride | melting point (°C.) | ceiling temp. of GIC in continuous use (°C.) |
| --- | --- | --- |
| $AlCl_3$ | 190 | <150 |
| $FeCl_3$ | 303 | <150 |
| $CdCl_2$ | 568 | 275 |
| $CuCl_2$ | 598 | 150 |
| $CoCl_2$ | 735 | 275 |
| $NiCl_2$ | 993 | 325 |
| $CrCl_3$ | 1150 | 500 |

In the process (B) for preparing GIC, a dried metal chloride, a salt for forming a molten salt of the metal chloride, a salt for forming a double salt in a gas phase together with the metal chloride, and graphite are reacted with each other in a molten state in a chlorine gas stream under atmospheric pressure.

The description about the metal chloride and the salt for forming a molten salt of the metal chloride given above in connection with process (A) is applicable to the case of process (B).

An important feature of process (B) resides in the use of a salt for forming a double salt in a gas phase together with a metal chloride to be intercalated into graphite.

Specific examples of the salt for forming a double salt in a gas phase include $AlCl_3$ and $FeCl_3$. The amount of addition of this salt is 1 to 3% by weight based on the total amount of the metal chloride to be intercalated and the salt for forming a molten salt of the metal chloride.

When the amount of addition of the salt for forming a double salt in a gas phase is less than 1% by weight, it is impossible to sufficiently promote the reaction for intercalating the metal chloride into the graphite. On the other hand, when the amount exceeds 3% by weight, the formed double salt is discharged together with the chlorine gas outside the reaction system and cooled to solidify, which hinders the flowing of the chlorine gas.

$AlCl_3$ and $FeCl_3$ may be used alone or in the form of a mixture of them.

The addition of the salt for forming a double salt in a gas phase enables the reaction for intercalating the metal chloride into graphite to be remarkably promoted.

The reason why the reaction is promoted by the addition of a salt for forming a double salt in a gas phase has not been yet elucidated. However, M. Schäfer: Z. anorg. allg. Chem., 403, 116–126 (1974) and E. Stumpp: Materials Science & Eng. 31, 53–59 (1977) each describe that, for example, $AlCl_3$ and a metal chloride form a stable salt in a gas phase as shown in the following formula and the double salt dissociates into the initial salts at a low temperature:

$$MCl_2 (S) + 2AlCl_3 (g) \rightleftharpoons MAl2Cl_8$$

wherein M is a metal atom. Therefore, it is believed that this double salt promotes the reaction for intercalating the metal chloride into graphite.

In the present invention, it is preferred that the above-described individual starting materials are sufficiently dried prior to the reaction.

In particular, when the dehydration of a metal chloride having water of crystallization and a salt for forming a double salt in a gas phase is insufficient, it becomes difficult to intercalate the metal chloride into the graphite. Therefore, it is particularly preferred that, in addition to the drying of the graphite, the hydrous metal chloride and the salt for forming a double salt in a gas phase be sufficiently dried to remove the water of crystallization and adherent water.

In process (B), the reaction is conducted by homogeneously mixing a metal chloride, a salt for forming a molten salt of the metal chloride, a salt for forming a double salt in a gas phase together with the metal salt, and graphite, placing the mixing in a glass vessel, heating the mixture under atmospheric pressure to prepare a melt, and flowing a chlorine gas above the melt. By this reaction, there is prepared an intended graphite intercalation compound.

The chlorine gas may be used in such an amount as will supplement the chlorine gas formed by the decomposition of the metal chloride. There is no need of using an autoclave or melt-sealing or sealing the glass vessel.

The reaction is conducted at a temperature by 10° to 20° C. higher than the eutectic point of the formed molten salt, i.e. usually at 380° to 450° C. As with the case of process (A), the metal chloride is kept at a proportion higher than that at the eutectic point.

This is to surely intercalate the intended metal chloride into graphite.

It is not particularly necessary to conduct agitation during the reaction. However, when a reaction vessel having a large capacity is used, it is preferred that agitation be conducted in order to uniformly progress the reaction.

In the above-described process (B) as well, as described above, GIC can be easily prepared through a reaction in a chlorine gas stream in a molten state under atmospheric pressure, which makes it possible to prepare GIC in a gas vessel on a commercial scale.

In particular, in process (B), the addition of a salt for forming a double salt together with a metal chloride enables the reaction for intercalating a metal chloride having a high melting point into graphite to be remarkably promoted.

The present invention will now be described with reference to the following Examples.

EXAMPLE 1

A 1000-ml heat-resistant round-bottom flask and a four-necked lid which can be fitted onto the flask were provided. The lid was equipped with a glass agitator, chlorine gas inlet and outlet tubes, and a thermometer.

The above vessel was charged with 4.1 mol of $CuCl_2.2H_2O$ and 3.35 mol of KCl. The mixture was heated in vacuo to remove water of crystallization and adherent water. 5 mol (60 g) of natural graphite (ash content: 0.3%; average particle size: 45 μm; particle size distribution: 20 to 100 μm) was added thereto and the vacuum dehydration was further continued, followed by heating of the mixture.

Since the metal salt melted at 400° C., the agitator was rotated, and a chlorine gas was passed through the flask.

The chlorine gas was discharged after neutralization with an aqueous NaOH or $Ca(OH)_2$ solution The heating of the mixture at 420° C. was continued for 4 hr, and the mixture was then allowed to stand for cooling. Then, water was added thereto to elute unreacted $CuCl_2$ and KCl, thereby separating GIC. The GIC was filtered and dried in vacuo to obtain a product.

Water of the recovered aqueous solution of unreacted metal chloride was evaporated in vacuo to recover the metal chloride. The recovered metal chloride can be reused.

The yield of GIC was 89 g and it was found from a calculation based on the chemical formula $C_{6n}CuCl_2$ (wherein n is the number of stage) that the GIC thus prepared is that of stage 2.

This was confirmed also from an X-ray diffraction pattern.

The electrical conductivity was measured by kneading GIC with carbon black, a binder, and a solvent to prepare a paste, applying the paste to a polyester film, and measuring the resistance of the coating film. As a result, it was found that the resistance of the coating film was $2.8 \times 10^{-3}$ Ω.cm.

By contrast, the resistance of a paste prepared by using graphite instead of GIC was $1.5 \times 10^{-2}$ Ω.cm.

EXAMPLE 2

A reaction (reaction time: 4 hr) for preparation of GIC was conducted in the same manner as that of Example 1, except that 4 mol of $CoCl_2$ was used instead of $CuCl_2.2H_2O$ and 5 mol (60 g) of graphite and 5.7 mol of NaCl were used. Thus, there was prepared 82 g of $CoCl_2GIC$.

It was found from an X-ray diffraction pattern that the GIC thus prepared is that of stages 2 and 3.

EXAMPLE 3

A reaction for preparation of GIC was conducted in the same manner as that of Example 1, except that the following two kinds of graphite were used instead of the graphite used in Example 1:

| average particle diameter: | 300 μm and 10 μm, |
| particle size distribution: | 1000 to 100 μm and 1 to 40 μm, |
| ash content | 0.3% in both kinds. |

The yields of GIC were 84 g and 78 g, respectively. It was found from an X-ray diffraction pattern that these GIC were that of stages 2 to 3 and that of stage 6, respectively.

A paste was prepared in the same manner as that of Example 1 for measurement of the resistance. As a result, it was found that the resistance of the pastes were $4.3 \times 10^{-3}$ Ω.cm and $5.6 \times 10^{-3}$ Ω.cm, respectively.

COMPARATIVE EXAMPLE 1

The reaction of Example 1 was conducted without supplying a chlorine gas to prepare 63 g of a product. It was found from an X-ray diffraction pattern of the product that the reaction for a period of 4 hr brought about no intercalation of the metal chloride into the graphite.

COMPARATIVE EXAMPLE 2

A reaction for preparation of GIC was conducted in the same manner as that of Example 1, except that the starting materials, i.e., $CuCl_2.2H_2O$ and KCl, were simultaneously dried before the reaction was conducted. A reaction product was taken out 4 hr after the initiation of the reaction. It was found that there occurred no intercalation of $CuCl_2$ into the graphite.

COMPARATIVE EXAMPLE 3

A reaction for preparation of GIC was conducted in the same manner as that of Example 1, except that $CuCl_2.2H_2O$ and KCl were used in amounts of 2.7 mol and 2.2 mol per mol of graphite, respectively, i.e., the amounts of the metal chlorides were reduced to $\frac{2}{3}$.

The yield of GIC 4 hr after the initiation of the reaction was 73.5 g, and the GIC thus prepared was that of stage 6. A conductive coating was prepared from the GIC, and the resistance was measured. As a result, it was found that the resistance of the coating is $9.2 \times 10^{-3}$ Ω.cm.

EXAMPLE 4

A 1000-ml heat-resistant round-bottom flask and a four-necked lid which can be fitted onto the flask were provided. The lid was equipped with a glass agitator, chlorine gas inlet and outlet tubes, and a thermometer.

The above vessel was charged with 4 mol of $CrCl_3$, 2.35 mol of NaCl, and 15 g of $AlCl_3$ (2% by weight based on the total amount of $CrCl_3$ and NaCl). The mixture was heated in vacuo to remove adherent water. Thereafter, 5 mol (60 g) of natural graphite (ash content 0 3%; average particle size: 45 μm; particle size distribution: 20 to 100 μm) was added thereto, and the vacuum dehydration was further continued, followed by heating of the mixture.

Since the salts melted at 450° C., the agitator was rotated, and a chlorine gas was passed through the flask.

After the mixture was heated at 460° C. for 4 hr, it was allowed to stand for cooling. Then water was added thereto to elute unreacted $CrCl_3$, NaCl, etc., thereby separating GIC. The GIC was then filtered and dried in vacuo to obtain a product.

The yield of GIC was 87.5 g and the analysis of an X-ray diffraction pattern has revealed that the GIC thus prepared is a mixture of that of stage 2 and that of stage 3. The amount of $AlCl_3$ contained in GIC was very small.

EXAMPLE 5

A reaction for preparation of GIC was conducted in the same manner as that of Example 4, except that instead of $CrCl_3$ used in Example 4, 4 mol of $NiCl_2$, 10 mol of KCl, 18 g of $AlCl_3$ (1.4% by weight based on the total amount of $NiCl_2$ and KCl), and 5 mol (60 g) of graphite were used and the mixture was heated at 515° C. [eutectic point 507° C.; $NiCl_2$ 28 mol%, KCl 72 mol%] for 4 hr. Thus, there was prepared 74.5 g of $NiCl_2$ GIC.

It was found from an X-ray diffraction pattern that the GIC thus prepared was a mixture of that of stage 2 and that of stage 3.

EXAMPLE 6

A reaction for preparation of GIC was conducted in the same manner as that of Example 4, except that instead of $CrCl_3$ used in Example 4, 4 mol of $CdCl_2$, 2.8 mol of NaCl, 18 g of $FeCl_3$ (2% by weight based on the total amount of $CdCl_2$ and NaCl), and 5 mol (60 g) of graphite were used and the reaction was conducted at 420° C. [eutectic point 397° C.; $CdCl_2$ 58 mol%, KCl 42 mol%; D. L. Dreadmore, J. Am. Ceram. Soc., 43, 593(1960)] for 4 hr. Thus, there was prepared 132 g of GIC of $CdCl_2$. It was found from an X-ray diffraction pattern that the GIC thus prepared was a mixture of that of stage 1 and that of stage 2.

COMPARATIVE EXAMPLE 4

A reaction for preparing GIC was conducted in the same manner as that of Example 4, except that $AlCl_3$ was not added. Thus, there was prepared 76.5 g of GIC of $CrCl_3$. It was found from an X-ray diffraction pattern that the GIC thus prepared was a mixture of that of stage 5 and that of stage 6.

COMPARATIVE EXAMPLE 5

A reaction for preparing GIC was conducted in the same manner as that of Example 5, except that $AlCl_3$ was not added. Thus, there was prepared 78.6 g of GIC of $NiCl_2$. It was found that the GIC thus prepared was a mixture of those of stages 6 and above.

COMPARATIVE EXAMPLE 6

A reaction for preparing GIC was conducted in the same manner as that of Example 6, except that $FeCl_3$ was not added. Thus, there was prepared 83 g of GIC of $CdCl_2$. It was found that the GIC thus prepared was a mixture of those of stages 4 to 60.

EXAMPLE 7

13 g of a binder composed of a modified ether type polyester (Stafix P-LC; a product of Fuji Photo Film Co., Ltd.) was dissolved in 60 g of a solvent composed of EGDA while heating and agitating. 16.2 g (corresponding to 10 g of graphite) of GIC containing $CuCl_2$ intercalated thereinto (stage 3) which had been prepared in the same manner as that of Example 1, and 4.3 g of carbon black (Ketjen Black EC; a product of Nippon EC Co., Ltd.) were added thereto. The mixture was kneaded with an ink roll while sufficiently agitating to prepare a composition.

The viscosity of the composition was 280 P.

The amount of carbon (GIC in terms of graphite +CB) was 110 parts by weight based on 100 parts by weight of the binder resin. The ratio of graphite to CB was 7:3. Further, the volatile content was 64%.

This composition was applied to a polyethylene terephthalate film (thickness: 125 μm) by screen printing to have a size of 60 mm×60 mm. The resultant coating film was dried at 120° C. for 15 min to cure the coating film, allowed to cool, and then subjected to the measurement of resistance with four probes for a surface ohmmeter.

The volume specific resistance was $3.44 \times 10^{-3}$ Ω.cm. Other physical properties of the coating film were as follows. The pencil hardness of the coating film was HB. The volume specific resistance as determined after bending at 180° and that after bending at 360° were $3.81 \times 10^{-3}$ Ω.cm and $4.06 \times 10^{-3}$ Ω.cm, respectively. Six fine lines each having a size of 2 mm×60 mm were printed and subjected to the measurement of resistance. The variation in the resistance values was 7.7 to 16.7%.

The composition was mixed with an equal amount of a silver paste ink (5007; a product of E.I. duPont de Nemours & Co.). The mixture was neither separated into two phases nor became turbid.

The heat resistance, moisture resistance, and heat cycle of the composition were measured. The results are shown in the following Table. The conditions for the measurement were as follows:

resistance: expressed in terms of volume specific resistance heat resistance: heated at 100° C.

moisture resistance: 50° C., 90% RH heat cycle: $-30°$ C.$\times 90°$ C., 12 hr for each cycle.

|  | resistance before test (Ω · cm) | resistance after 192 hr (Ω · cm) | rate of change (%) | resistance after 264 hr (Ω · cm) | rate of change (%) |
| --- | --- | --- | --- | --- | --- |
| heat resistance | $2.44 \times 10^{-3}$ | $2.44 \times 10^{-3}$ | ±0 | $2.37 \times 10^{-3}$ | −2.8 |
| moisture resistance | $6.36 \times 10^{-3}$ | $6.02 \times 10^{-3}$ | −5.3 | $6.53 \times 10^{-3}$ | +2.6 |
| heat cycle | $3.44 \times 10^{-3}$ | $3.32 \times 10^{-3}$ | −3.3 | $3.62 \times 10^{-3}$ | +5.3 |

Note:
The heat resistance and moisture resistance tests were conducted by allowing the sample to stand under test conditions for one day and then at room temperature for one day.

The test on the adhesion to a substrate film was conducted according to the cross cut cellophane adhesive tape method (JIS D 0202). With respect to each composition prepared in this Example and the Examples which will be described later, the adhesion was 100/100.

EXAMPLE 8

A coating composition was prepared from GIC containing $CoCl_2$ intercalated thereinto (stages 3 to 4) which had been prepared in the same manner as that of Example 1 in such a manner that the ratio of GIC to CB (Ketjzen Black EC) was 7 : 3, the PHR of carbon (in terms of graphite) relative to the binder (Stafix) was 110, and the amount of the solvent (EDGA) was such that the volatile content was 64%.

The resistance of the coating film was $3.86 \times 10^{-3}$ Ω.cm in terms of the volume specific resistance. The resistance after bending at 180° and that after bending at 360° were $4.32 \times 10^{-3}$ Ω.cm and $4.61 \times 10^{-3}$ Ω.cm, respectively. The variation in the resistance values as determined by making use of fine lines was 5.8 to 11.4%.

COMPARATIVE EXAMPLE 7

A composition was prepared and tested in the same manner as that of Example 7, except that 10 g of graphite SP-5 was used instead of 16.2 g of GIC.

The volume specific resistance was $1.2 \times 10^{-2}$ Ω.cm, the pencil hardness of the coating film was H, and the resistance after bending at 180° and that after bending at 360° were $1.31 \times 10^{-2}$ Ω.cm and $1.42 \times 10^{-2}$ Ω.cm, respectively. The variation in the resistance values as determined by making use of fine lines was 6.4 to 13.5%.

COMPARATIVE EXAMPLE 8

Two kinds of carbon black, i.e., SP-20 manufactured by Nippon Graphite Industries, Ltd. having an average particle size of 45 μm and a particle size distribution of 1 to 25 μm and MBC-50 manufactured by the same company having an average particle size of 300 μm and a particle size distribution of 150 to 420 μm, were each reacted with CuCl$_2$ to prepare GICs. The GICs thus prepared were both those of stage 3.

Compositions were prepared from these GICs in the same manner as that of Example 1. These compositions each had a carbon PHR of 110, a graphite to CB ratio of 7/3, and a volatile content of 66%. The volume specific resistance of each coating film was measured and found to be $1.3 \times 10^{-2}$ Ω.cm and $2.2 \times 10^{-2}$ Ω.cm, respectively.

The resistance after bending at 180° and that after bending at 360° were $1.42 \times 10^{-2}$ Ω.cm and $1.47 \times 10^{-2}$ Ω.cm, respectively, for one sample and $2.5 \times 10^{-2}$ Ω.cm and $2.61 \times 10^{-2}$ Ω.cm, respectively, for the other sample.

The variation in the resistance values determined by making use of six fine lines each having a size of 2 mm×60 mm was 4.91 to 44.1% due to the influence of the particle size of the graphite.

COMPARATIVE EXAMPLE 9

A composition was prepared in the same manner as that of Example 1, except that GIC was used in an amount of 23.2 g (corresponding to 14.3 g of graphite) instead of 16.2 g and no Ketjen Black EC was used. The resistance of a coating film prepared from the composition was measured.

The PHR value and the volatile content were 110 and 60%, respectively.

The volume specific resistance was $2.6 \times 10^{-2}$ Ω.cm and the resistance after bending at 180° and that after bending at 360° were $2.81 \times 10^{-2}$ Ω.cm and $3.59 \times 10^{-2}$ Ω.cm, respectively. The variation in the resistance values was 18.7%.

I claim:

1. A process for preparing a graphite intercalation compound comprising reacting together, under substantially molten conditions, including a temperature of about 380° to 450° C., a dried metal chloride selected from the group consisting of copper chloride, cadmium chloride, cobalt chloride, nickel chloride and chromium chloride; a metal salt, capable of forming a molten salt by reaction with said metal chloride, selected from the group consisting of potassium chloride and sodium chloride; and graphite having a particle size of about 20 to 70 microns, in a chlorine gas atmosphere at about atmospheric pressure; wherein said metal chloride is present in an amount of at least 0.5 mole per mole of graphite, in excess of the proportion of metal chloride which would be present at the eutectic point of the molten metal salt, but not sufficient to cause a solid phase of said metal chloride in said molten reaction system.

2. The process as claimed in claim 1 further including in said reaction system, about 1 to 3% by weight, based on the total weight of said metal chloride and said salt capable of forming a molten salt therewith, a salt which is capable of forming a double salt in the gas phase with said metal chloride selected from the group consisting of aluminum chloride and iron chloride.

* * * * *